Patented Feb. 2, 1943

2,310,028

UNITED STATES PATENT OFFICE 2,310,028

CANNED FOOD PRODUCT

Elmer G. Gustavson, Chicago, Ill., assignor to Quaker Oats Company, Chicago, Ill., a corporation of New Jersey No Drawing. Application July 26, 1939, Serial No. 286,623

10 Claims. (Cl. 99—182)

This invention relates to canned foods and has for an object the provision of a new and improved canned porridge, such as oatmeal, wheat porridge, corn meal mush, and the like.

Grains and grain products which are adapted to be cooked with water in order to produce hot breakfast foods known as mush, porridge, oatmeal, and the like, generally in the past have been sold to the consumer in the dry condition. In order to convert these materials to an edible condition, it has been necessary to cook them with suitable quantities of water immediately prior to use. The cooking process served to gelatinize the starch and glutinous material in the grain. These products have distinctive flavors, aromas, and colors which have been accepted by the public.

It recently has been proposed to prepare and market grain porridges in the ready-cooked state. The methods suggested include the steps of introducing the grain and water suspension, either in the gelatinized or non-gelatinized state, into suitable containers and subjecting the container and contents to elevated temperatures and pressures, whereby sterilization of the product may be effected. Sterilization is difficult and requires high and prolonged heat treatment. I have found that oats, for example, under this treatment and in the presence of air and/or common metals, such as tin, iron, aluminum, copper, and zinc, rapidly develop an objectionable color, flavor, and aroma. Therefore, one of the objections to such porridges prepared by the prior art method is due to the fact that the sterilization was accomplished in the presence of air or metals, such as tin, iron, aluminum, copper and zinc, or both. By my method these objectionable features of the prior art processes are eliminated.

Furthermore, it has been possible by prior art methods to add only limited amounts of grain to water in order to produce the desired porridge. The amount of grain that could be added has been limited in a large degree by the amount of gelatinization that occurs when the porridge is subjected to the heat treatment. If a relatively large amount of grain is present, the cooking process with attendant gelatinization converts the product into a congealed mass which is difficult to handle and remove from the container, and subsequently difficult to stir into a homogeneous mixture for serving. Upon standing, after removal from the can, the product becomes thick and rubbery and unpalatable. I have overcome these difficulties in a substantial degree.

One object of this invention is the manufacture of a cereal porridge, such as oatmeal, possessing a desirable color, flavor, and aroma.

Another object is the production of a cereal porridge which contains an increased amount of solids as compared to prior art products of similar nature but at the same time has a greatly reduced consistency whereby it may be readily removed from the container and easily prepared for serving.

A further object is to prepare an oat porridge which does not become thick and rubbery and unpalatable upon exposure to air after removal from the container.

Still a further object is to prepare a cereal porridge which has been partially pre-digested by enzyme action.

Further and additional objects will appear from the following description and the appended claims.

In accordance with this invention, the above objects may be obtained by pre-cooking, enzymatically digesting, and sterilizing the porridge in a definite and prescribed manner.

It has been discovered that the desirable qualities of the food may be retained in the canned product if the water suspension of the grain is not heated above approximately 212° F. in direct contact with copper, iron, aluminum, tin, and zinc. This is because the sulfur compounds normally present in the cereal grains react with these metals under the sterilization conditions normally employed in the canning industry. The color, flavor, and aroma may be substantially improved by heating, sterilizing, and packaging the porridge in containers constructed of materials which are non-reactive to the organic sulfur compounds normally present within the material. The inherent sulfur compounds have a tendency to react with such metals as iron, tin, copper, aluminum, or zinc. The corresponding metallic sulfides and sulfide complexes cause discoloration and development of objectionable flavor in the product which has come into contact therewith. The adverse effect of contacting the porridge with metals that are reactive to the sulfur compounds is most apparent at elevated temperatures or when the material remains in contact with the porridge for long periods of time. In those cases the discoloration may be readily noticed and has been termed in the art "sulfide spangling."

The product may be further improved by introducing and sealing it into suitable containers with the total exclusion of oxygen from the air. This may be accomplished by pre-cooking and sealing the porridge in containers in an atmosphere of an inert gas, whereby molecular oxygen is completely removed and excluded from the container. The mass may then be heat processed in the sealed container in accordance with the usual practice, and sulfide spangling with subsequent change in flavor and color is thereby substantially eliminated. If desired, the porridge may be finally packaged in cans or containers which are lined with enamel, glass, suitable lacquer, or other material which is substantially non-reactive to the sulfur compounds present within the grain porridge.

In accordance with one preferred embodiment of this invention, however, the cooked, enzymatically digested porridge is sterilized in a separate chamber or autoclave at suitable temperatures and pressures, and is subsequently aseptically introduced into substantially sterile containers. The containers are then aseptically sealed and cooled. The filled containers are ready for immediate distribution without further heat processing. The sterilization process is preferably carried out in a pressure cooker which is constructed of materials non-reactive to the sulfur compounds of the porridge. The color and flavor of the product are not adversely affected if this is done. When the sterilization is carried out before introducing the porridge into the final container, it is not necessary to seal the porridge into the container in an atmosphere of carbon dioxide or other inert gas, although in certain instances this may be desirable. Furthermore, the final packaging containers need not be lined with a sulfur resistant material, although this may be in certain instances preferable.

For a more complete understanding of the present invention, a specific example is given below for the preparation of canned oatmeal. To a steam jacketed kettle, preferably of stainless steel, glass or porcelain lined, 5.31 parts by weight of water and 0.03 part by weight of sodium chloride are added. The resulting solution is brought to a boil and 1.00 part of steel-cut dry oatmeal or rolled oats are stirred into the boiling solution. The mixture is actively boiled with frequent stirring for about twenty minutes. It is desirable to keep the kettle covered with a lid during boiling in order to reduce loss of water through evaporation which helps retain flavor and aroma that might pass off in the steam. This pre-cooking operation is carried out primarily to expediate the subsequent digestion by diastase. The hot porridge material is then weighed and the water lost through evaporation may be replaced. The porridge is then cooled to a temperature favorable to diastatic action, a suitable temperature being around 126° F. A finely-ground malted barley is carefully weighed out to equal 0.005 part by weight or 0.5 per cent of the weight of the oats present in the mixture. The malted barley is thoroughly mixed with a small amount of water and stirred quickly and thoroughly into the cooked and cooled porridge. The porridge is stirred slowly while it is being digested by the added malt diastase. After two minutes of digestion at 126° F., heat is applied at such a rate to raise the temperature of the mass to 149° F. in a period of about two and one-half minutes. At that temperature the enzymatic activity of the malted barley is destroyed. The digestion period indicated above is designed for a finely-ground malted barely having a Lintner value of 176 degrees. It will be apparent, however, that the type or source of diastase is not to be limited to the particular substances, materials, and technique as mentioned above. The specific embodiments of the enzymatic digestion operation are herein set forth for the purpose of illustration only.

After the temperature of the porridge has been raised to about 149° F., as indicated above, the heating is continued until the malted porridge is brought to boiling. The boiling is continued with frequent stirring for about twenty minutes. This second boiling treatment tends to eliminate an undesirable curdled appearance which results if the malted porridge is subjected directly to superatmospheric pressure cooking immediately after the malt treatment. At this point it may again be desirable to replace the water lost by evaporation by the addition of boiling water.

The enzymatically digested material prepared in accordance with the above-indicated process may be sterilized by any one of several methods. In accordance with one method, the oat porridge is first sterilized and subsequently introduced and sealed into sterile cans under aseptic conditions. In order to carry out this process, the semi-cooked digested porridge resulting from the above-described method is transferred to a stainless steel, glass, porcelain lined, or vitreous closed chamber or pressure cooker and subjected to elevated temperatures at superatmospheric pressures. A suitable processing may include heating the porridge to about 240° F. for a period of one to two hours. The material may be stirred during the sterilization treatment if desired. The oat porridge should not come into contact with such metals as iron, tin, copper, aluminum, or zinc while undergoing the superatmospheric pressure heat sterilization treatment. The processing should only be sufficiently severe to insure complete sterilization of the porridge. Excessive treatments may result in slight changes in the flavor, aroma, and color of the product. After the heat treatment, the sterilized porridge is rapidly cooled to a temperature below the boiling point of the water, and introduced and sealed into sterile containers. The entire filling and sealing process is carried out under aseptic conditions. Immediately after sealing, the containers containing the porridge are immersed in cold water and cooled rapidly.

In accordance with a second method, the sterilization of the porridge may be carried out after the product has been sealed within the container. In accordance with this modification, the enzyme digested porridge is boiled for about twenty minutes in an atmosphere of carbon dioxide while simultaneously bubbling carbon dioxide through the porridge. Meanwhile the containers are placed in a carbon dioxide chamber in order to completely displace the air within the containers. After the boiling of the porridge, it is introduced directly into the containers and hermetically sealed, the process being carried out entirely in a carbon dioxide atmosphere. The sealed containers are placed in a retort and sterilized for ninety minutes at 240° F. The containers, on removal from the retort, are immediately immersed in cold water to cool rapidly. The above procedure contributes to the improvement of flavor, aroma, and color of the canned product. It is desirable in this embodiment to employ a container having a liner which is substantially non-reactive to the sulfur compounds contained within the oat porridge.

In accordance with a third method, the cooked and digested oat porridge may be sterilized within the sealed container without previously entirely excluding the oxygen by means of carbon dioxide gas. The product may not be quite so desirable, however, since it tends to have a somewhat stronger flavor due to the fact that oxygen was permitted to contact the contents during the sterilizing operation.

It will be recognized that the example given above for the preservation of an oat porridge was merely presented by way of example. A great many modifications of the general process described will readily occur to those skilled in the art. For example, the process may be employed with other materials than the above-indicated oat porridge or oatmeal, such as corn meal mush, wheat porridge, etc. Furthermore, it is not intended that this invention be limited by the specific times, temperatures, and proportions indicated in the above examples.

The products formed in accordance with this invention have all of the color characteristics, flavor, and aroma of freshly prepared porridge. The consistency of the product has been materially reduced so that it may be more readily removed from the container and more easily broken up for serving. The lower consistency of the mass also decreases the intensity of processing necessary for complete sterilization of the product. The granular individuality of the grain particles is retained within the porridge if the sterilization temperature is not too high or the period of treatment too long.

While it is true that very desirable results have been obtained by employing the specific processes herein described, the invention is intended to cover any suitable modifications which would occur to one skilled in the art and fall within the scope of the following claims.

I claim:

1. The process of preparing cereal, whereby its natural color, aroma, and flavor are retained, which comprises precooking the cereal with water, enzymatically digesting the mass with diastase for a predetermined period of time and at a predetermined temperature, heating the mass to destroy the diastase, cooking the mass a second time in an atmosphere containing carbon dioxide in the absence of free oxygen, introducing the mass into a sulfur insensitive container in an atmosphere of carbon dioxide whereby oxygen is excluded from contact with the mass, hermetically sealing the container, sterilizing the sealed container and contents at elevated temperatures and pressures, and rapidly cooling the same.

2. The process of claim 1 in which the cereal is oatmeal.

3. An improved process for preparing canned oat porridge, whereby the natural color, flavor, and aroma of the product are retained, which comprises boiling a water and oats mixture at atmospheric pressure, cooling the resulting mass, subjecting the mass to diastatic digestion, heating the mass whereby the diastase is destroyed, boiling the mass at atmospheric pressure in a carbon dioxide atmosphere and simultaneously passing carbon dioxide through the boiling mass, introducing the cooked mass into containers and sealing the same in an atmosphere of carbon dioxide whereby contact of the mass with free oxygen from the air is substantially prevented at all times, and subsequently sterilizing the sealed container and contents at elevated temperatures and pressures.

4. A process of preserving oatmeal, whereby its natural color, aroma, and flavor are retained, which comprises admixing dry oats with a measured amount of water, precooking the mixture at boiling temperatures and atmospheric pressures, cooling the resulting mass, adding malt diastase to the mass, incubating the mass until a predetermined degree of enzymatic digestion of the mass has occurred, heating the mass to a temperature sufficient to inactivate the diastase, subsequently subjecting the mass to a second precook at boiling temperature and atmospheric pressure, subjecting the second precooked mass to temperatures above boiling and pressures above atmospheric in a pressure cooker to effect sterilization of the mass, aseptically introducing the sterilized mass into sterilized containers, and aseptically sealing said containers.

5. The process of claim 4 in which the final sterilization of the mass is carried out in a pressure cooker that is substantially inert to the sulfur compounds contained within the mass at the temperatures of sterilization.

6. The process of preparing cereal, whereby its natural color, aroma, and flavor are retained, which comprises precooking the cereal with water, enzymatically digesting the mass with diastase for a predetermined period of time and at a predetermined temperature, heating the mass to destroy the diastase, cooking the mass a second time, introducing the cooked mass into a sulfur insensitive container, hermetically sealing the container, sterilizing the sealed container and contents at elevated temperatures and pressures, and rapidly cooling the same.

7. In the art of packaging cereal porridge whereby the individuality of the cereal particles is maintained and the consistency of the product reduced, the steps which comprise precooking the cereal in water to gelatinize a portion of the starch, cooling the cereal to a temperature suitable for diastatic digestion, adding diastatic enzymes and maintaining the mixture at a temperature suitable for digestion to partially digest the gelatinized material, destroying the activity of the enzymes, boiling the partially digested mixture under atmospheric pressure for a predetermined period of time sufficient to substantially prevent curdling during subsequent superatmospheric pressure heating and sterilization, and sterilizing the mass under superatmospheric pressure.

8. A process of preserving a cereal whereby its natural color, aroma, and flavor are retained, which comprises admixing dry cereal with a measured amount of water, precooking the mixture at boiling temperatures and atmospheric pressures, cooling the resulting mass, adding malt diastase to the mass, incubating the mass until a predetermined degree of enzymatic digestion of the mass has occurred, heating the mass to a temperature sufficient to inactivate the diastase, subsequently subjecting the mass to a second precook at boiling temperature and atmospheric pressure, subjecting the second precooked mass to temperatures above boiling and pressures above atmospheric in a pressure cooker to effect sterilization of the mass, aseptically introducing the sterilized mass into sterilized containers, and aseptically sealing said containers.

9. The process of preparing a cereal which comprises precooking the cereal in water to gelatinize a portion of the starch, cooling the cereal to a temperature suitable for diastatic digestion, adding diastatic enzymes and maintaining the mixture at a temperature suitable for digestion to partially digest the gelatinized material, destroying the activity of the enzymes, boiling the partially digested mixture under atmospheric pressure for a predetermined period of time sufficient to substantially prevent curdling during subsequent superatmospheric pressure cooking steps, introducing the mass into containers, sealing the containers, and heating the sealed containers to sterilize the sealed containers and contents.

10. In the process of preparing a canned oat porridge, the steps which comprise boiling oats in water for about 20 minutes to gelatinize a portion of the starch, cooling the mixture to a temperature of about 126° F. suitable for diastatic digestion, adding malt to the mixture, and maintaining the mixture at a temperature of about 126° F. for about two minutes to partially digest the gelatinized material, heating the mass to about 149° F. in a period of about two and one-half minutes to destroy the enzymatic activity of the malt, boiling the partially digested mixture under atmospheric pressure for about 20 minutes to eliminate curdling during the subsequent superatmospheric pressure cooking step, and cooking the mass under superatmospheric pressure.

ELMER G. GUSTAVSON.